UNITED STATES PATENT OFFICE.

HENRY C. STIEFEL, OF PITTSBURGH, PENNSYLVANIA, ASSIGNOR OF ONE-HALF TO ALEXANDER M. NEEPER, OF PITTSBURGH, PENNSYLVANIA.

BATCH FOR SEMI-OPAQUE, SEMI-TRANSLUCENT GLASS.

1,153,353. Specification of Letters Patent. Patented Sept. 14, 1915.

No Drawing. Application filed July 23, 1914, Serial No. 852,730. Renewed July 10, 1915. Serial No. 39,173.

*To all whom it may concern:*

Be it known that I, HENRY C. STIEFEL, a citizen of the United States, residing in the city of Pittsburgh, county of Allegheny, and State of Pennsylvania, have invented new and useful Improvements in a Batch for Semi-Opaque, Semi-Translucent Glass, of which the following is a specification.

My invention relates to new and useful improvements in semi-opaque, semi-translucent white glass.

One of the principal objects of my invention is to produce semi-opaque, semi-translucent glass of whitish color, without fluorescence or fire and without the use of fluorin or a compound thereof.

My invention consists of a semi-opaque, semi-translucent whitish glass made without the use of fluorin or a compound thereof and the batch therefor.

The batch for my improved glass consists of the ingredients commonly used for the production of crystal glass in connection with the use of nitrate of lime as one of the ingredients thereof, preferably consisting of sand, soda ash, lead oxid, nitrate of lime and suitable decolorizing agents; of an opacifying agent which does not contain fluorin and is not a compound thereof; and certain ingredients which are consistent with the above two classes of ingredients, which when heated in connection therewith are comparatively inert but are productive of a gas when fused therewith which keeps the entire mass of the batch in gentle ebullition.

Preferably the batch will consist of the following ingredients in substantially the following quantities by weight: sand, 60 parts; soda ash, 15 parts; lead oxid, 15 parts; nitrate of lime, 3½ parts; phosphate of magnesia, 3½ parts or less; carbonate of magnesia, 3½ parts; alum 3½ parts. Using 3½ parts of phosphate of magnesia makes a comparatively opaque whitish translucent glass. If it is desired that the glass made have a greater degree of translucency, then the quantity of phosphate of magnesia may be reduced until the desired degree of translucency is attained; by adding a greater quantity than 3½ parts, by weight, to the batch the glass will become a white opaque glass. The phosphate of magnesia is introduced as a fine white dry powder.

The batch substantially in the quantities above indicated being introduced into the melting pot of a glass furnace has heat applied to it until the fusible ingredients of the batch are completely fused and volatile products escape. The application of heat to the batch has the effect of dislodging from the carbonate of magnesia carbonic acid gas; from the alum the gases composing the water contained in that compound, as well as the gases in the phosphate of magnesia. The escape of these gases during the fusion and heating of the mass keeps the batch in a gentle constant state of ebullition and causes the phosphate of magnesia, which by the heat applied is transformed into fine particles of pyrophosphate of magnesia, to be distributed as fine solid particles through the fused mass, thereby imparting to the mass and the resultant glass made therefrom opacity and translucency. The absence of the fluorin or a compound thereof results in the glass, manufactured according to my invention, being entirely free from fluorescence or "fire" usually present in opal glasses.

What I claim as my invention is:—

1. A batch for a semi-opaque, semi-translucent glass, consisting of a foundation batch to produce a crystal glass, in combination with phosphate of magnesia and additional ingredients comparatively inert and neutral to the foregoing ingredients of said batch, which upon the fusion thereof evolve gases which in passing off keep said batch, while in a fused condition, in a condition of ebullition.

2. A batch for a semi-opaque, semi-translucent glass, consisting of a foundation batch to produce crystal glass, one of whose ingredients is nitrate of lime, in combination with phosphate of magnesia and additional ingredients comparatively inert and neutral to the foregoing ingredients of said batch, which upon the fusion thereof evolve gases which in passing off keep said batch, while in a fused condition, in a condition of ebullition.

3. A batch for semi-opaque, semi-translucent glass, consisting of the following ingredients in substantially the following quantities by weight: sand, 60 parts; soda ash, 15 parts; lead oxid, 15 parts; nitrate of lime, 3½ parts; phosphate of magnesia, 3½ parts; carbonate of magnesia, 3½ parts; alum 3½ parts.

4. A batch for semi-opaque, semi-translucent glass, consisting of the following ingredients in substantially the following quantities by weight: sand, 60 parts; soda ash, 15 parts; lead oxid, 15 parts; nitrate of lime, 3½ parts; phosphate of magnesia, ½ part to 3½ parts; carbonate of magnesia, 3½ parts; alum 3½ parts.

In witness whereof I have hereunto subscribed my name in the presence of two subscribing witnesses.

HENRY C. STIEFEL.

Witnesses:
 JAMES F. CALLAHAN,
 A. M. NEEPER.